US012688401B2

(12) United States Patent
Asselin et al.

(10) Patent No.: US 12,688,401 B2
(45) Date of Patent: Jul. 21, 2026

(54) CLASSIFYING LINEAR INFRASTRUCTURE ELEMENTS USING A GRAPH NEURAL NETWORK

(71) Applicant: Bentley Systems, Incorporated, Exton, PA (US)

(72) Inventors: Louis-Philippe Asselin, Quebec City (CA); Karl-Alexandre Jahjah, Quebec City (CA); Marc-André Gardner, Quebec City (CA); Samuel Lamhamedi, Quebec City (CA)

(73) Assignee: Bentley Systems, Incorporated, Exton, PA (US)

( * ) Notice: Subject to any disclaimer, the term of this patent is extended or adjusted under 35 U.S.C. 154(b) by 637 days.

(21) Appl. No.: 18/144,529

(22) Filed: May 8, 2023

(65) Prior Publication Data

US 2024/0378426 A1 Nov. 14, 2024

(51) Int. Cl.
  *G06N 3/0464* (2023.01)
  *G06N 3/04* (2023.01)
  (Continued)

(52) U.S. Cl.
  CPC ............. *G06N 3/0464* (2023.01); *G06N 3/09* (2023.01); *G06N 3/04* (2013.01); *G06N 3/08* (2013.01);
  (Continued)

(58) Field of Classification Search
  CPC .......... G06N 3/0464; G06N 3/09; G06N 3/04; G06N 3/08; G06N 3/088; G06V 20/588;
  (Continued)

(56) References Cited

U.S. PATENT DOCUMENTS

2021/0117716 A1* 4/2021 Lapointe ................. G06T 19/00
2022/0121886 A1* 4/2022 Jahjah .................... G06V 20/64

OTHER PUBLICATIONS

You et al., NPL ("Delineation and geometric modeling of road networks" Published 2009 by ISPRS Journal of Photogrammetry and Remote Sensing, 17 pages (Year: 2009).*

(Continued)

*Primary Examiner* — Quoc A Tran

(74) *Attorney, Agent, or Firm* — Cesari and McKenna, LLP; James A. Blanchette

(57) ABSTRACT

In example embodiments, improved techniques are provided for classifying elements of an infrastructure model that represents linear infrastructure (e.g., roads). The techniques may extract a set of cross sections perpendicular to a centerline of the linear infrastructure from the infrastructure model, generate a graph representation of each cross section to produce a set of graphs having nodes that represent elements and edges that represent contextual relationships, provide the set of graphs to a trained graph neural network (GNN) model, and produce therefrom class predictions for the elements. The class predictions may include one or more predicted classes for each element with a respective confidence. A best predicted class for each element may be selected and assigned to the element, thereby creating a new version of the infrastructure model. For elements that extend through multiple cross sections, the selection may involve aggregating predicted classes originating from the different graphs.

20 Claims, 11 Drawing Sheets

(51) Int. Cl.

| | |
|---|---|
| *G06N 3/08* | (2023.01) |
| *G06N 3/088* | (2023.01) |
| *G06N 3/09* | (2023.01) |
| *G06T 7/11* | (2017.01) |
| *G06T 17/05* | (2011.01) |
| *G06V 10/44* | (2022.01) |
| *G06V 10/82* | (2022.01) |
| *G06V 20/10* | (2022.01) |
| *G06V 20/56* | (2022.01) |

(52) U.S. Cl.

CPC ................ *G06N 3/088* (2013.01); *G06T 7/11* (2017.01); *G06T 17/05* (2013.01); *G06T 2207/20081* (2013.01); *G06T 2207/20084* (2013.01); *G06T 2207/30256* (2013.01); *G06V 10/454* (2022.01); *G06V 10/82* (2022.01); *G06V 20/182* (2022.01); *G06V 20/588* (2022.01)

(58) Field of Classification Search

CPC .... G06V 10/82; G06V 10/454; G06V 20/182; G06T 2207/20081; G06T 2207/20084; G06T 2207/30256; G06T 7/11; G06T 17/05; G06K 9/6256

See application file for complete search history.

(56) References Cited

OTHER PUBLICATIONS

Agarwal, Aniket, et al., "Visual Relationship Detection Using Scene Graphs: A Survey", arXiv, arXiv:2005.08045v1 [Cs.CV], May 16, 2020, pp. 1-30.

Collins, Fiona, "Encoding of Geometric Shapes from Building Information Modeling (BIM) Using Graph Neural Networks," Master Thesis, ETH Zürich, ETH-Nr. 13-816-046, Sep. 11, 2020, pp. 1-91.

"Fundamentals: OpenRoads Designer, (Formerly MicroStation), Connect Edition," TDOT Roadway Design Division, TN TDOT Department of Transportation, Nov. 2020, pp. 1-247.

Gharaee, Zahra, et al., "Graph representation Learning for Road Type Classification," Elsevier Ltd., Elsevier, ScienceDirect, Pattern Recognition, vol. 120, No. 108174, Jul. 15, 2021, pp. 1-11.

Jepsen, Tobias Skovgaard, et al., "Graph Convolutional Networks for Road Networks," arXiv, arXiv:1908.11567v3 [cs.LG], Jul. 22, 2020, pp. 1-10.

Jin, Chaoyi, et al., "Exploring BIM Data by Graph-based Unsupervised Learning," SCITEPress, Science Technology Publications, Lda., In Proceedings of the 7th International Conference on Pattern Recognition Applications and Methods (ICPRAM 2018), Jan. 2018, pp. 582-589.

Li, Shuohao, et al., "Attentive Gated Graph Neural Network for Image Scene Graph Generation," MDPI, Symmetry, vol. 12, No. 511, Apr. 2, 2020, pp. 1-13.

Rosinol, Antoni, et al., "3D Dynamic Scene Graphs: Actionable Spatial Perception with Places, Objects, and Humans", arXiv, arXiv:2002.06289v2 [cs.RO], Jun. 16, 2020, pp. 1-11.

U.S. Appl. No. 17/314,735, filed May 7, 2021 by Louis-Philippe Asselin, et al. for Classifying Elements and Predicting Properties in an Infrastructure Model Through Prototype Networks and Weakly Supervised Learning, pp. 1-40.

U.S. Appl. No. 17/963,824, filed Oct. 11, 2022 by Marc-André Lapointe, et al. for Classifying Elements in an Infrastructure Model Using Convolutional Graph Neural Networks, pp. 1-29.

Geng, Yixuan, et al., "3DGraphSeg: A Unified Graph Representation-Based Point Cloud Segmentation Framework for Full Range High-Speed Railway Environments," IEEE, IEEE Transaction on Industrial Informatics, IEEE Service Center, New Yourk, NY, US, vol. 19, No. 12, Feb. 17, 2023, pp. 11430-11443.

Joshi, Rucha Bhalchandra, et al., "eBIM-GNN: Fast and Scalable Energy Analysis Through BIMs and Graph Neural Networks," 2022 IEEE 7th International Energy Conference (EnergyCon 2022), IEEE, May 9, 2022, pp. 1-8.

"Notification of Transmittal of the International Search Report and the Written Opinion of the International Searching Authority, or the Declaration," International Filing Date: Apr. 19, 2024, International Application No. PCT/US2024/025513, Date of Mailing: Jul. 22, 2024, pp. 1-11.

Yin, Mengtian, et al., "Two-stage Text-to-BIMQL Semantic Parsing for Building Information Model Extraction Using Graph Neural Networks," Elsevier B.V., Automation in Construction, Elsevier, Amsterdam, Netherlands, vol. 152, No. 104902, May 3, 2023, pp. 1-19.

* cited by examiner

CLIENT SIDE
SOFTWARE
110

CLIENTS 120

CLOUD-BASED
SOFTWARE 112

INFRASTRUCTURE
MODELING HUB
SERVICES 130

REPOSITORY
140

DESIGN VALIDATION SERVICE 150

CROSS SECTION
EXTRACTION PROCESS 152

GRAPH GENERATION PROCESS 154

SELECTION AND
AGGREGATION PROCESS 156

GNN MODEL 158

300

350

600

CLASSIFYING LINEAR INFRASTRUCTURE ELEMENTS USING A GRAPH NEURAL NETWORK

BACKGROUND

Technical Field

The present disclosure relates generally to infrastructure modeling, and more specifically to techniques for classifying elements of infrastructure models that represent linear infrastructure (e.g., roads).

Background Information

Infrastructure typically refers to structures and facilities needed for the operation of an organization, company, community, country, or other entity, such as buildings, factories, plants, roads, railways, utility networks, and the like. One type of infrastructure is linear infrastructure. As used herein, the term "linear infrastructure" refers to infrastructure that has a predominately line-like character, such that it extends along the length of a corridor. Examples of linear infrastructure include roads, railways, electrical transmission lines, and the like.

As part of the design, construction and/or operation of infrastructure, including linear infrastructure (e.g., roads), it is often desirable to create infrastructure models. As used herein the term "infrastructure model" refers to a three-dimensional (3D) computer aided design (CAD) model of infrastructure. An infrastructure model may be a built infrastructure model (BIM) or digital twin of infrastructure. A BIM is a digital representation of infrastructure as it should be built, providing a mechanism for visualization and collaboration. A digital twin is a digital representation of infrastructure as it is actually built, and is often synchronized with information representing current status, working condition, position or other qualities. An infrastructure model is typically composed of a number of individual elements. As used herein, the term "element" refers to a record that represents an individual unit of infrastructure within an infrastructure model.

It is often necessary to classify elements of infrastructure models that represent linear infrastructure (e.g., roads) in order to execute analytical tools on the model. The class (e.g., category, user label, ECClass, etc.) of an element may indicate the element is part of a group of similar elements and should be treated similarly during analysis. For example, if the linear infrastructure is a road, the class may indicate the element is part of a traffic lane, curb, shoulder, etc.

Infrastructure models that represent linear infrastructure (e.g., roads) are often constructed by federating data from distributed sources. These data sources may include different amounts of class information that utilize various different types of nomenclature. It is often impractical to establish at the source standards that ensure certain amounts of class information are always present and that the nomenclature used is always coherent. Even if standards are established, if they are not rigorously monitored an organization or vendor may introduce non-compliant data. Further, even if there is diligent standards enforcement, sometimes errors will still occur in data. For example, due to human error elements may be misclassified.

Accordingly, it is often necessary to classify elements once they are federated into an infrastructure model, to correct misclassifications, fill in missing information, etc.

This may be done in a number of different ways. Some techniques require a user to manually classify each element one-by-one. However, infrastructure models may include huge numbers of elements. In addition to being extremely time consuming, manually classifying elements one-by-one may be error prone. Other techniques may rely upon a set of semantic rules. However, crafting semantic rules that are effective typically requires particular expertise, and even the best semantic rules often still do not cover all edge cases. Further, semantic rules often only effective for the particular project to which they have been tailored. Recrafting semantic rules for each project may be nearly as time consuming as manually classifying elements themselves.

Some more sophisticated techniques have been attempted to address the issues of manual classification and semantic rules. For example, some machine learning (ML) techniques have been attempted. In one such technique, an attempt was made to use a random forest classifier to classify elements. In another technique, a k-nearest neighbors classifier was similarly attempted. However, such techniques struggled to classify elements of infrastructure models that represent linear infrastructure (e.g., roads), exhibiting low accuracy. The low accuracy may be the result of a number of limitations of these techniques. Such techniques often require large training datasets to be effective. However, for various types of linear infrastructure, the datasets that are practically available may be relatively small. Further, such techniques typically do not consider relative position of elements and other contextual information, but instead focus upon intrinsic geometry of elements. Often, when dealing with linear infrastructure, different classes of elements have very similar intrinsic geometry, differing primarily in their context.

Accordingly, there is a need for improved techniques for classifying elements of infrastructure models that represent linear infrastructure (e.g., roads).

SUMMARY

In example embodiments, improved techniques are provided for classifying elements of an infrastructure model that represents linear infrastructure (e.g., roads). The techniques may extract a set of cross sections perpendicular to a centerline of the linear infrastructure from the infrastructure model, generate a graph representation of each cross section to produce a set of graphs having nodes that represent elements and edges that represent contextual relationships, provide the set of graphs to a trained graph neural network (GNN) model, and produce therefrom class predictions for the elements. The class predictions may include one or more predicted classes for each element with a respective confidence. A best predicted class for each element may be selected and assigned to the element, thereby creating a new version of the infrastructure model. For elements that extend through multiple cross sections (and thereby are represented by nodes included in multiple graphs), the selection may involve aggregating predicted classes originating from the different graphs. In some cases, the assigned classes may be manually reviewed and corrected as needed by a user. Information regarding corrected classes may be maintained and used, for example, to retrain the GNN model to improve future prediction performance.

In one specific example embodiment, a method is provided for classifying elements in an infrastructure model that represents linear infrastructure using a trained GNN model. Software executing on one or more computing devices accesses the infrastructure model that represents linear infrastructure, and extracts a set of cross sections perpendicular to a centerline of the linear infrastructure from the infrastructure model. The software generates a graph representation of each cross section to produce a set of graphs having nodes that represent elements in the cross section and edges that represent contextual relationships between the elements. The software applies the set of graphs to the trained GNN model to produce class predictions for the elements represented by the nodes, selects a predicted class of each of the elements from the class predictions, and assigns the predicted classes to respective elements to create a new version of the infrastructure model that is maintained in memory or storage of the one or more computing devices.

In another specific example embodiment, a computing device is provided having a processor and a memory coupled to the processor that is configured to store a software application configured to classify elements in an infrastructure model that represents linear infrastructure. The software application includes a cross section extraction process configured to extract a set of cross sections perpendicular to a centerline of the linear infrastructure from the infrastructure model. It also includes a graph generation process configured to generate a graph representation of each cross section to produce a set of graphs having nodes that represent elements in the cross section and edges that represent contextual relationships between the elements. It further includes a trained GNN model configured to produce class predictions for the elements represented by the nodes based on the set of graphs. Additionally, it includes a selection and aggregation process configured to, for one or more elements that extend through multiple cross sections and thereby are represented by nodes included in multiple graphs, aggregate class predictions originating from different graphs.

It should be understood that a variety of additional features and alternative embodiments may be implemented other than those discussed in this Summary. This Summary is intended simply as a brief introduction to the reader, and does not indicate or imply that the examples mentioned herein cover all aspects of the disclosure, or are necessary or essential aspects of the disclosure.

BRIEF DESCRIPTION OF THE DRAWINGS

The description below refers to the accompanying drawings of example embodiments, of which.

DETAILED DESCRIPTION

The following detailed description describes example embodiments. Any references to items in the singular should be understood to include items in the plural, and vice versa, unless explicitly stated otherwise or otherwise clear from the context. Grammatical conjunctions are generally intended to express any and all disjunctive and conjunctive combinations of conjoined clauses, sentences, words, and the like, unless otherwise stated or clear from the context. For example, the term "or" should generally be understood to mean "and/or." Any recitation of ranges of values are not intended to be limiting, are provided as examples only, and are not intended to constitute a limitation on the scope of the described embodiments. Further, any recitation of ranges should be interpreted as referring individually to any and all values falling within the range, unless otherwise indicated, and each separate value within such a range should be treated as if it were individually recited. Terms of approximation such as "about," "approximately," "substantially" or the like, should be construed as referring to an allowance for deviation that is appreciated by one of ordinary skill in the art to still permit satisfactory operation for the corresponding use, function or purpose, or the like. No language in the description should be construed as indicating an element is a necessary or essential aspect of the disclosure.

Figure 1:
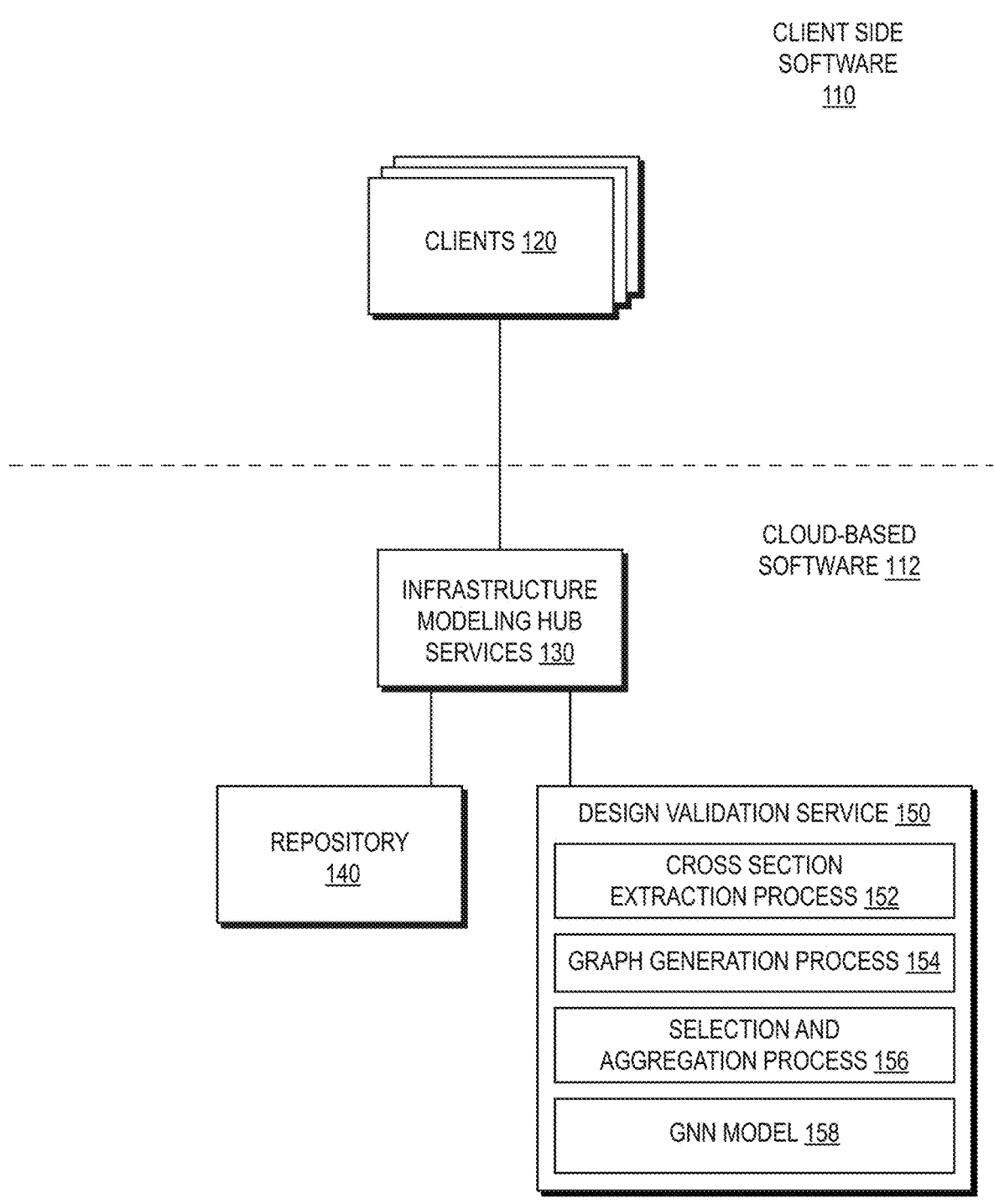
FIG. 1 is a high-level block diagram of at least a portion of an example software architecture that may implement the techniques described herein.

FIG. 1 is a high-level block diagram of at least a portion of an example software architecture that may implement the techniques described herein. The architecture may be divided into client-side software 110 executing on one or more computing devices arranged locally (collectively "client devices"), and cloud-based services software 112 executing on one or more remote computing devices ("cloud computing devices") accessible over the Internet. Each computing device may include processors, memory/storage, a display screen, and other hardware (not shown) for executing software, storing data and/or displaying information. The client-side software 110 may include client software applications (or simply "clients") 120 operated by users. The clients 120 may be of various types, including desktop clients that operate directly under an operating system of a client device and web-based client applications that operate within a web browser. The clients 120 may be concerned mainly with providing user interfaces that allow users to create, modify, display and/or otherwise interact with infrastructure models that represent linear infrastructure. One specific type of infrastructure model may be an iModel® infrastructure model. An infrastructure model (e.g., iModel®) may be represented as a 3D mesh, wherein each element of the linear infrastructure is represented using polygons having vertices. When so represented, elements of linear infrastructure may appear as long extrusions of a relatively simple geometric shapes.

The cloud-based software 112 may include infrastructure modeling hub services (e.g., iModelHub™ services) 130 and other services software that manage repositories 140 that maintain the infrastructure models. The infrastructure modeling hub services (e.g., iModelHub™ services) 130 may interact with a number of other services in the cloud that perform information management and support functions. One such service may be a design validation service 150 which may be capable of automatically classifying elements of an infrastructure model that represents linear infrastructure (e.g., roads). The design validation service 150 may include a cross section extraction process 152, graph generation process 154, a selection and aggregation process 156, and a GNN model 158.

Figure 2:
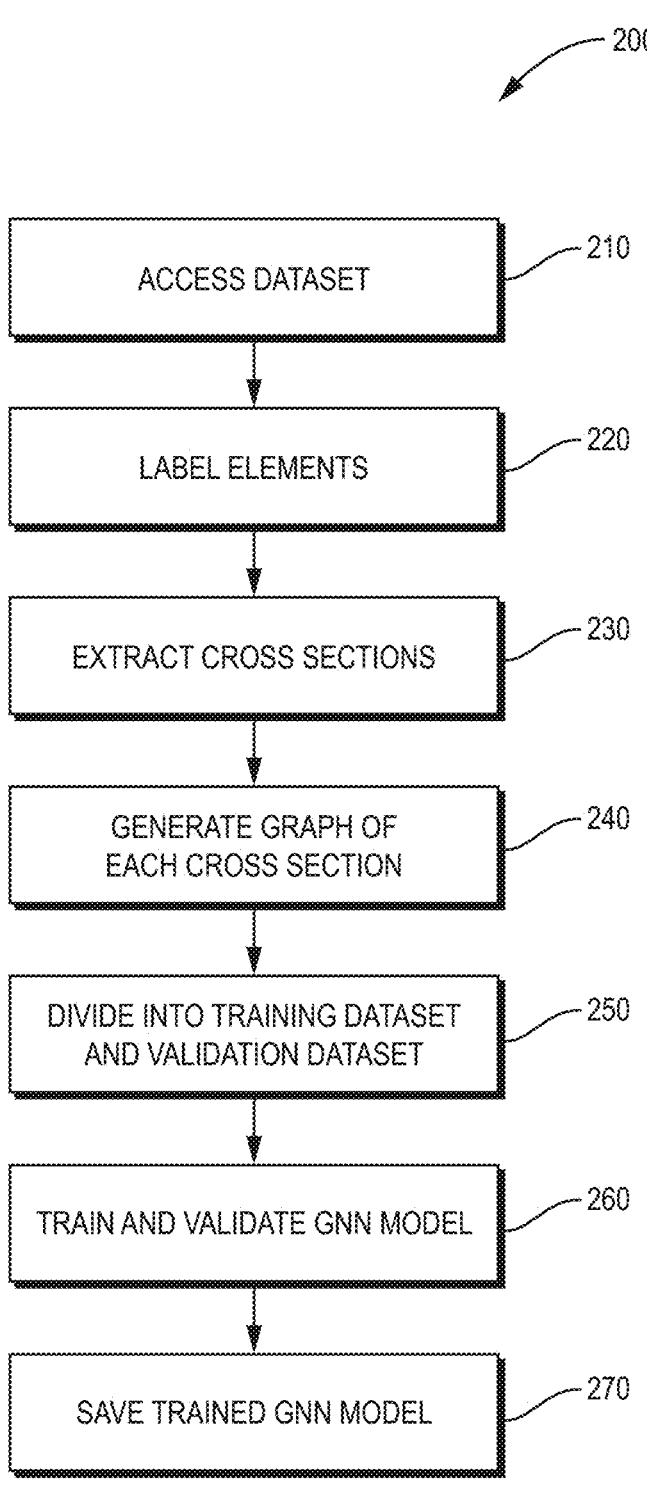
FIG. 2 is a flow diagram of an example sequence of steps that may be executed to train a GNN model to predict classes for elements of an infrastructure model that represents linear infrastructure (e.g., a road)

FIG. 2 is a flow diagram of an example sequence of steps 200 that may be executed to train a GNN model 158 to predict classes for elements of an infrastructure model that represents linear infrastructure (e.g., a road). The step 200 may be executed by the design validation service 150 or other software.

Figure 3A:
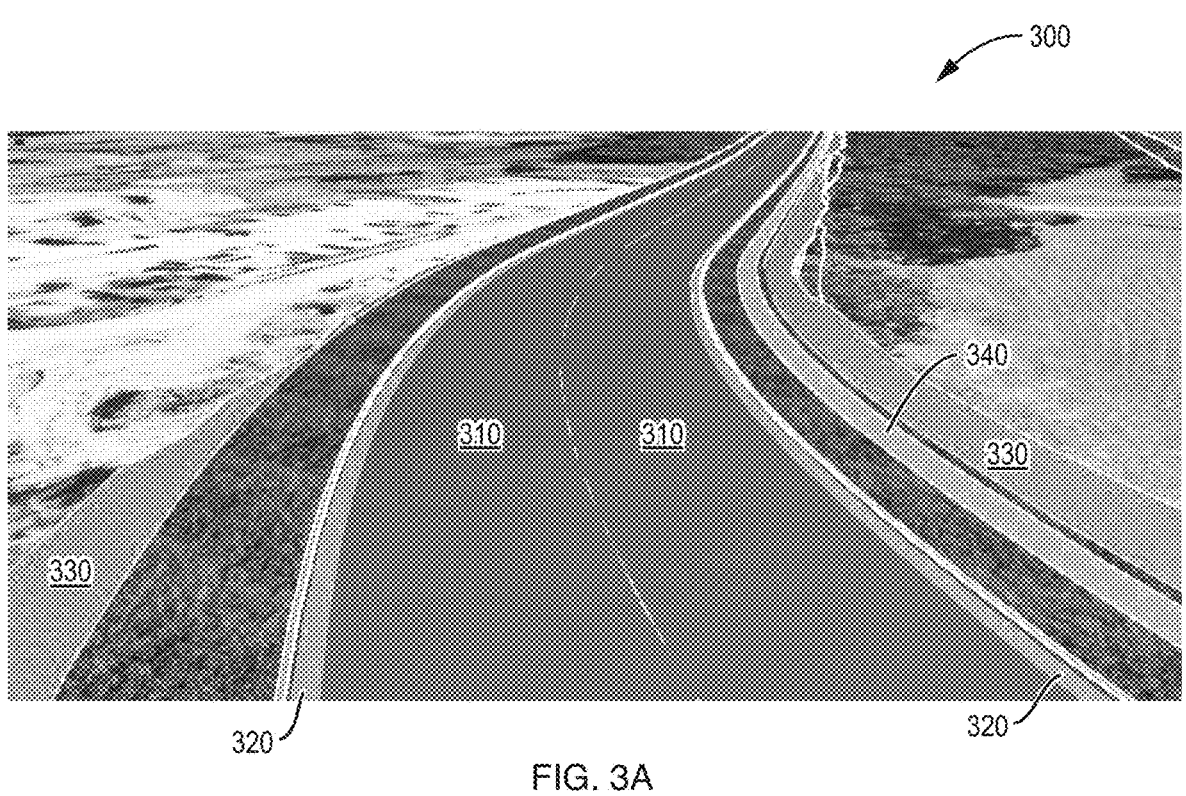
FIG. 3A is a render with texture of a first portion of an example infrastructure model depicting a simple road.
Figure 3B:
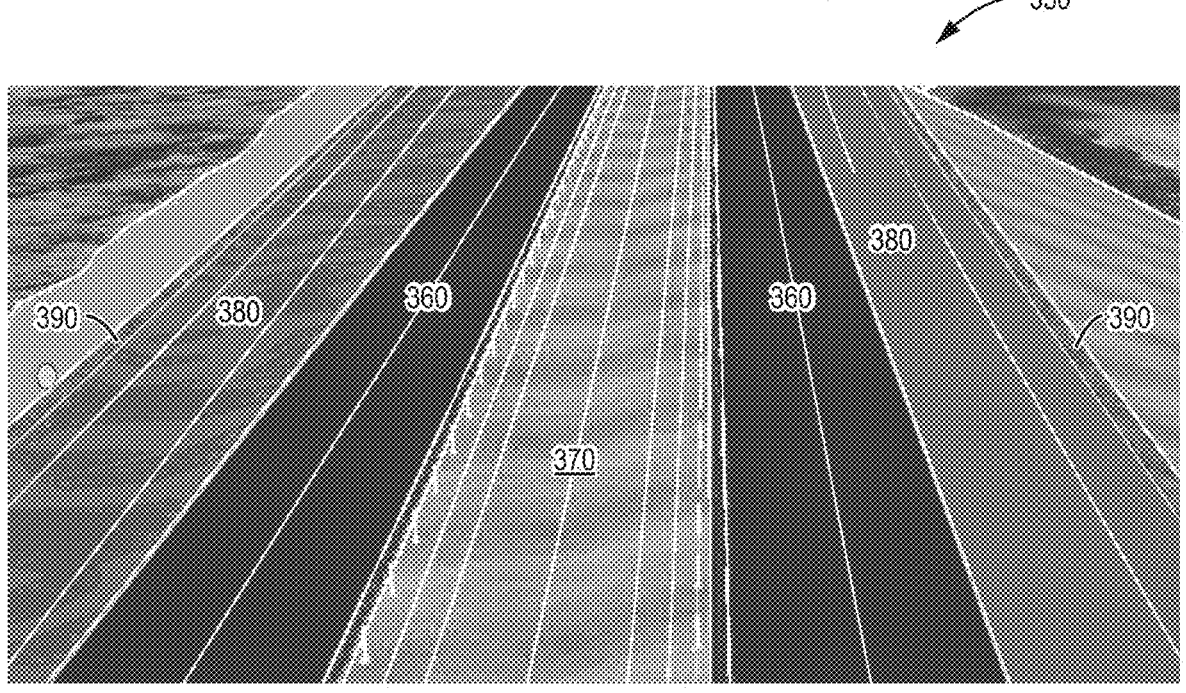
FIG. 3B is a render of a second portion an example infrastructure model depicting a more complex road.

At step 210, a dataset is accessed that includes a plurality of infrastructure models that represent linear infrastructure (e.g., roads). The linear infrastructure (e.g., roads) may have varying levels of complexity at different locations. FIG. 3A is a render with texture of a first portion of an example infrastructure model depicting a simple road. The portion includes elements for a single traffic lane 310 in each direction, along with additional elements that represent a shoulder 320, roadside 330, sidewalk 340 and the like. FIG. 3B is a render 350 of a second portion of an example infrastructure model depicting a more complex road. The portion includes elements for multiple traffic lanes 360 in each direction, along with additional elements that represent a central reserve 370, turning lanes 380, roadside 390, and the like.

Figure 3C:
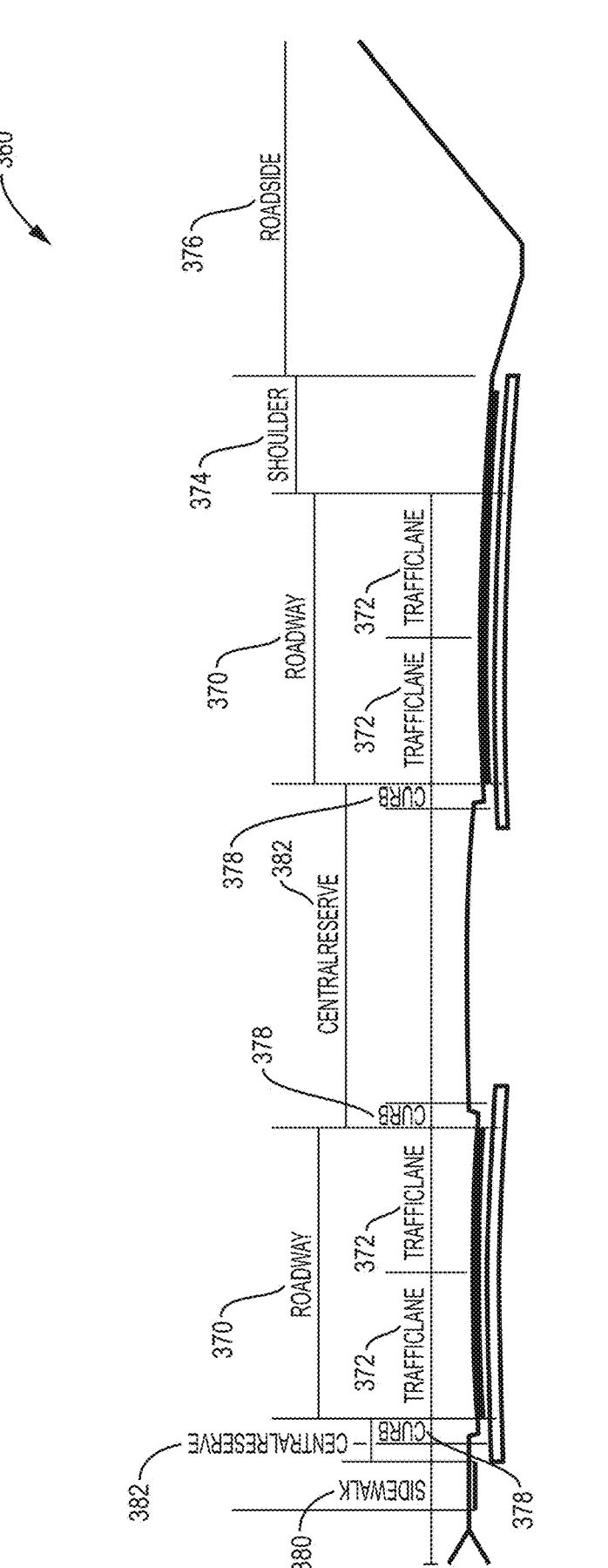
FIG. 3C is a diagram illustrating an example model schema that may be used in classifying elements of a road.

At step 220, the elements of the plurality of infrastructure models of the dataset are labeled with a class (e.g., a particular category, user label, ECClass, etc.). In one implementation, the labeling is performed manually by a user according to a model schema that provides general labeling rules. FIG. 3C is a diagram 360 illustrating an example model schema that may be used in classifying elements of a road. The model schema provides a number of specific classes into which element may be classified, including a roadway class 370 for elements related to the part of the road intended for vehicles, a traffic lane class 372 for elements related to the part of a roadway intended for travel in a particular direction, a shoulder class 374 for elements related to a region adjacent to a roadway/traffic lane, a roadside class 376 for elements related to a region adjacent to a shoulder, a curb class 378 for elements related to projections at the side of a roadway/traffic lane, a sidewalk class 380 for elements related to surfaces on which pedestrians are intended to walk, and a central reserve class 382 for elements related to a region of the road between roadways/traffic lanes or between a curb and a sidewalk. Elements that do not fit into one of these classes may be assigned to an "other" class (not shown). For example, elements that relate to barriers, bridges, intersections, etc. may be assigned to the "other" class.

The labeling may be performed manually, for example, using a labeling user interface (e.g., a labeling tool) of the design validation service 150. Alternatively, the labeling may be performed at least in part in an automated manner, for example, using a set of semantic rules, another trained ML model, or other techniques.

At step 230, the cross section extraction process 152 extracts a set of cross sections perpendicular to a centerline of the linear infrastructure from infrastructure models of the dataset. The cross section extraction process 152 may first locate alignments in each infrastructure model. As used herein, the term "alignment" refers to a special type of linear element that represents the centerline of linear infrastructure. For example, where the linear infrastructure is a road an alignment may represent the centerline of the road (with both horizonal and vertical components). The cross section extraction process 152 may progress at predetermined intervals (e.g., ever 5 meters in model space) and cut cross sections along planes perpendicular to the alignments from a 3D mesh representation of the infrastructure model (e.g., starting from one end of each alignment and progressing to the other end). The result may be a set of cross sections of the linear infrastructure.

Figure 4A:
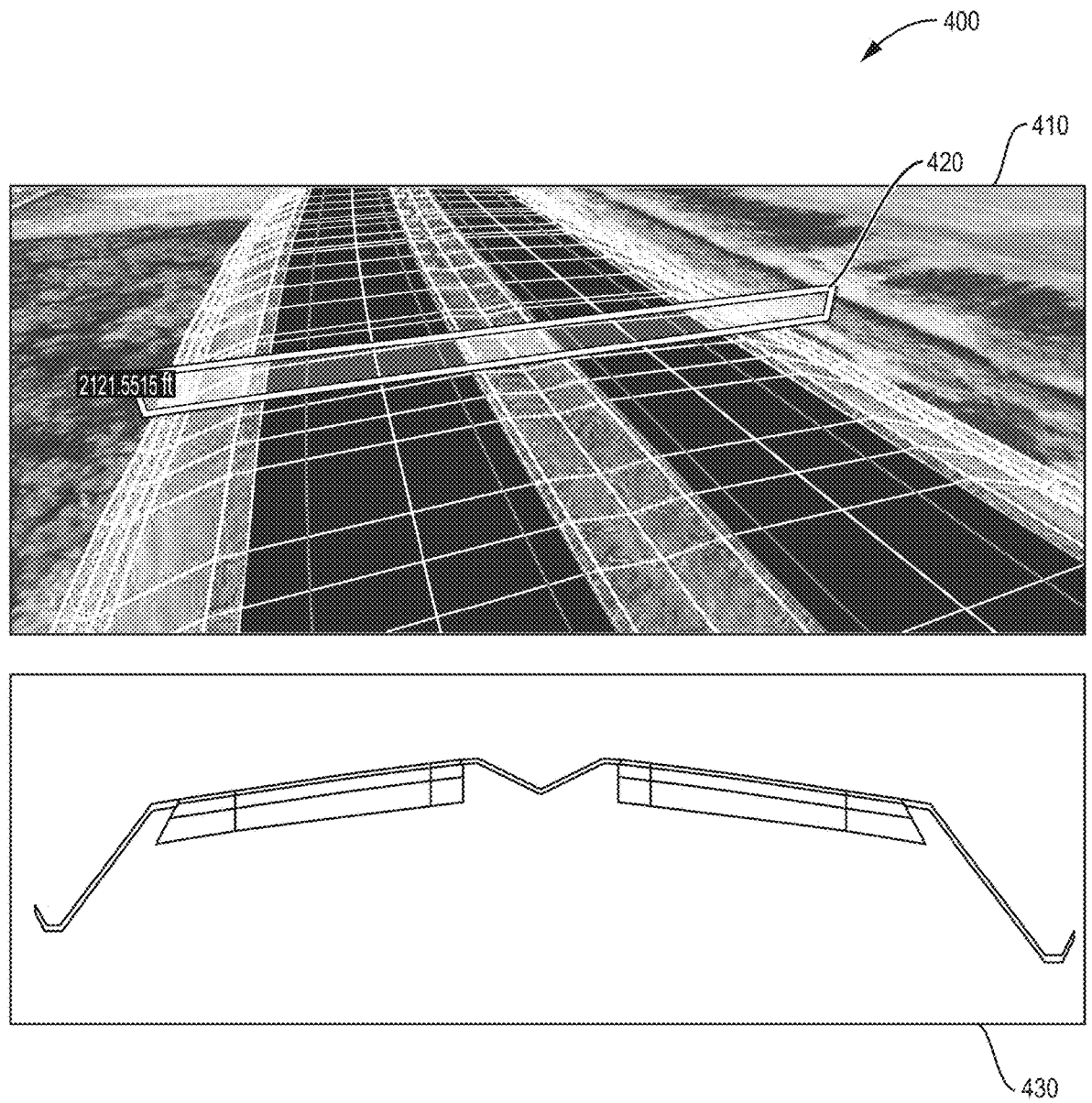
FIG. 4A is an illustration of extracting an example cross section from a road of an example infrastructure model.

FIG. 4A is an illustration 400 of extracting an example cross section from a road of an example infrastructure model. The upper portion 410 shows a 3D mesh of the road with a plane 420 perpendicular to an alignment thereof. While only a single plane is shown, it should be understood that multiple planes may be placed at predetermined intervals along the road. The lower portion 430 shows a cross section 430 that may be extracted from along the plane 420. If multiple planes were placed at predetermined intervals, multiple such cross sections may be extracted.

Figure 4B:
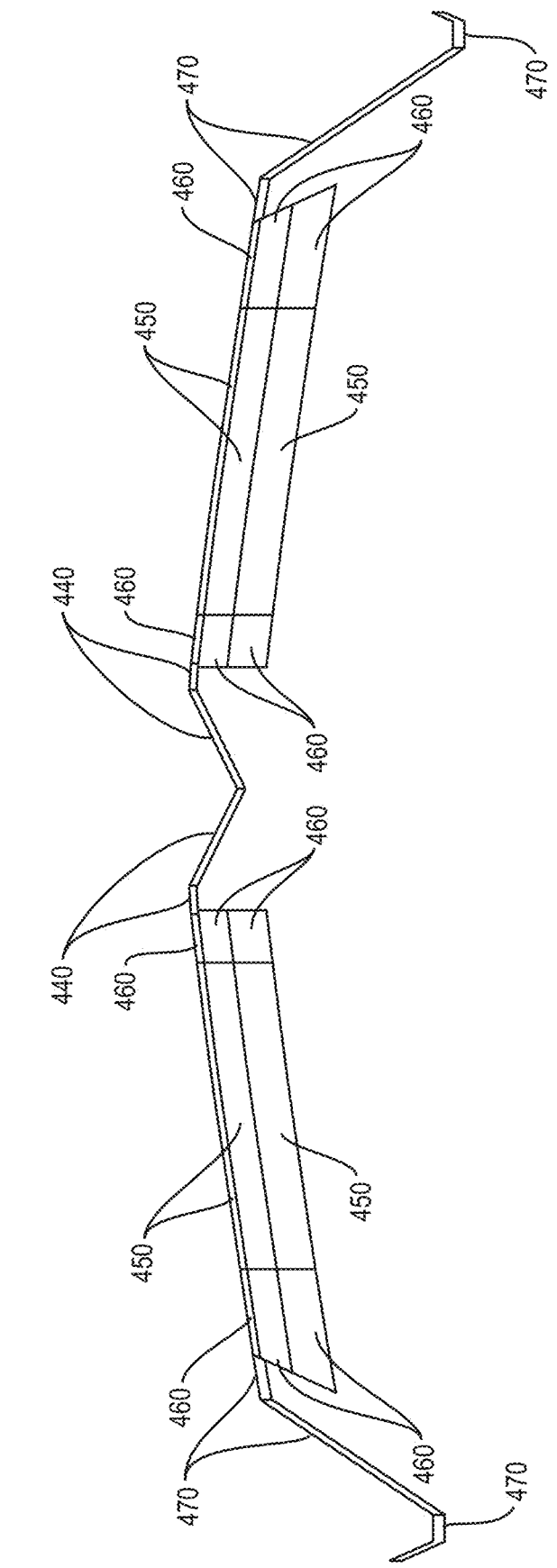
FIG. 4B is a more detailed view of the cross section from FIG. 4A, showing class labels for each of the elements in the cross section of the road.

FIG. 4B is a more detailed view 450 of the cross section 430 from FIG. 4A, showing class labels for each of the elements in the cross section of the road. The cross section 430 includes elements 440 of a central reserve, elements 450 of a roadway, elements 460 of a roadside, and elements 470 of a shoulder.

At step 240, the graph generation process 154 generates a graph representation of each cross section to produce a set of graphs. The nodes of the graph may represent elements and their properties (e.g., geometric properties such as width, height, area, slope angle, number of points (vertices), radius of gyration, position, etc.). The edges of the graph may represent contextual relationships between elements and include information describing the contextual relationships (e.g., geometric information such as distance, relative area, number of overlapping points (vertices), etc.).

The graph generation process 154 may generate the graph for each cross section using a multistep algorithm. In one implementation, the graph generation process 154 determines the elements in the cross section and generates a respective node in the graph for each determined element. Next, the graph generation process 154 extracts properties from each element and assigns them to the element's corresponding node. The graph generation process 154 further compares the positions and properties of the elements to determine contextual relationships and generates edges that connect nodes in the graph for the contextual relationships.

Figure 5A:
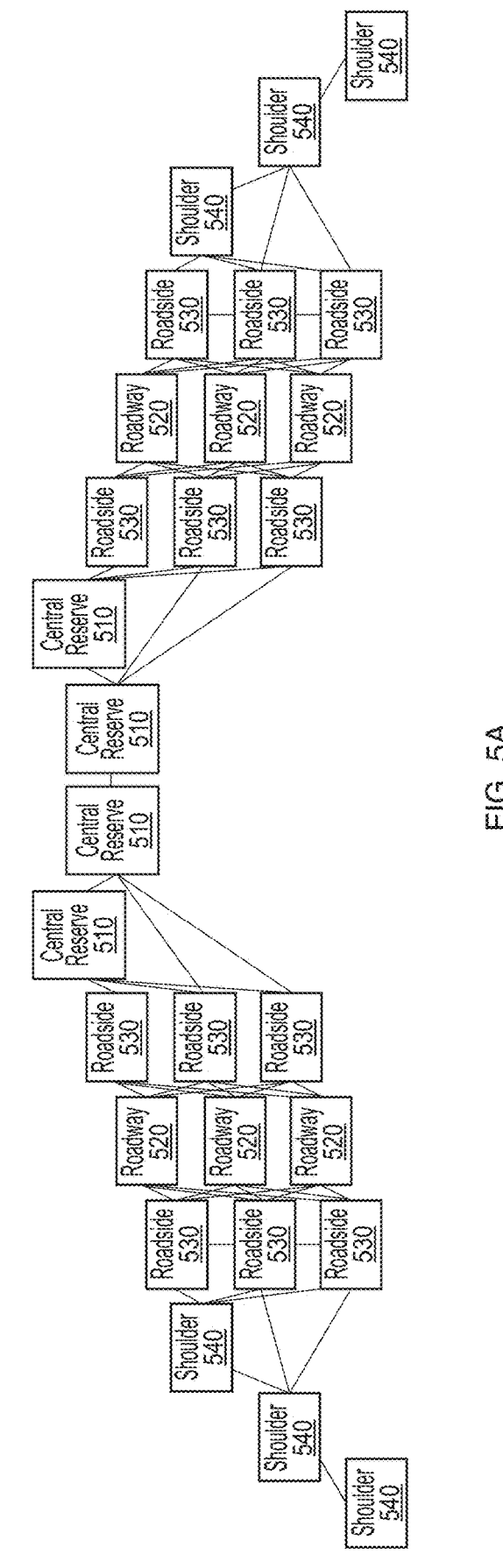
FIG. 5A is a simplified view of an example graph that may be produced from the example cross section of FIGS. 4A and 4B.

FIG. 5A is a simplified view of an example graph 500 that may be produced from the example cross section 430 of FIGS. 4A and 4B. The graph includes nodes 510 that represent elements of a central reserve class, nodes 520 that represent elements of a roadway class, nodes 530 that represent elements of a roadside class, and nodes 540 that represent elements of a shoulder class. While not shown in this simplified graph 500, each node 510-540 typically includes a number of properties. Further, while only a single edge is shown in FIG. 5A between each pair of nodes, multiple edges may connect nodes and each typically will include information describing the contextual relationship.

Figure 5B:
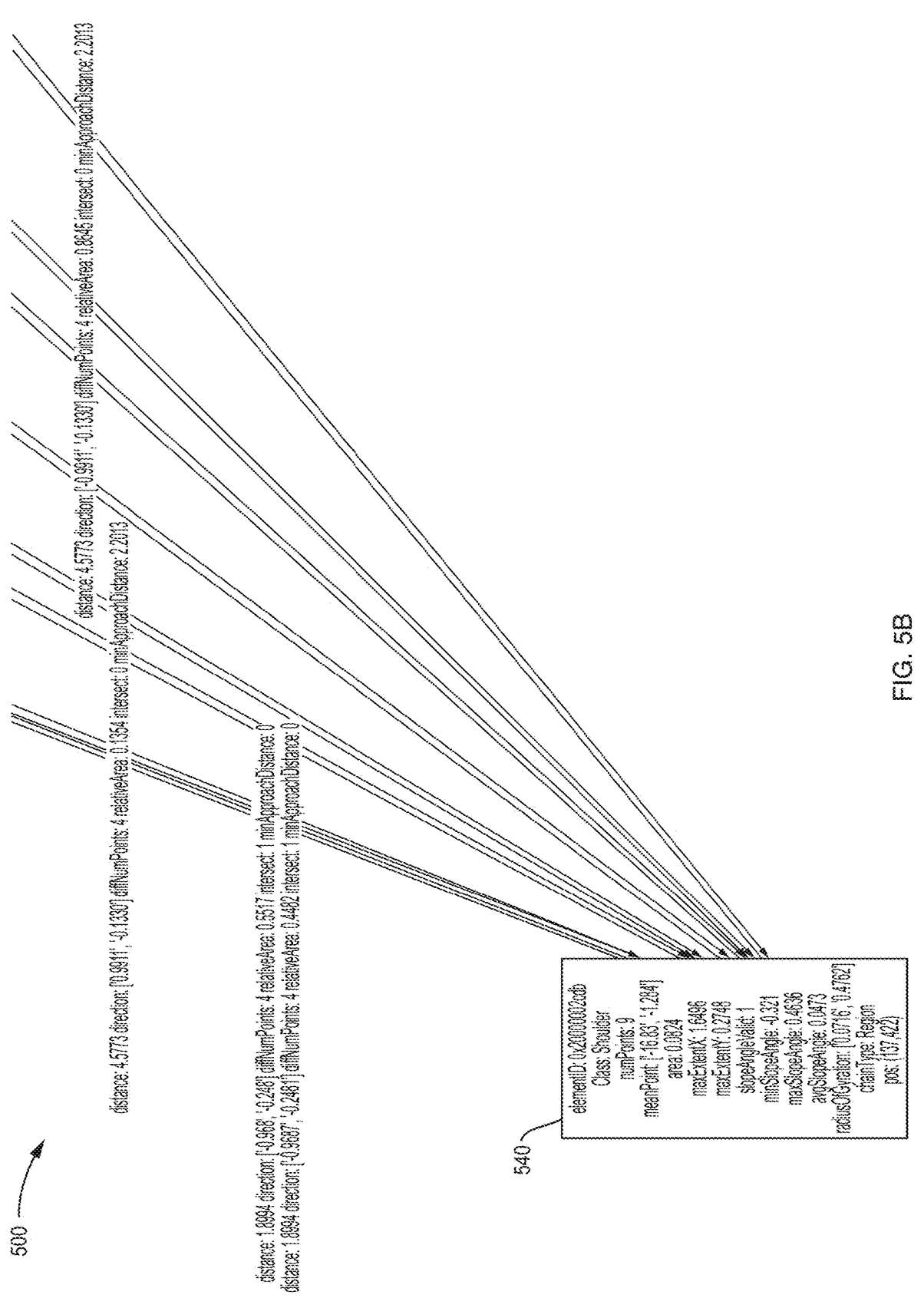
FIG. 5B is an example more detailed view of a portion of the example graph of FIG. 5A, showing properties and information describing contextual relationships related to one of the nodes representing a shoulder element.

FIG. 5B is an example more detailed view of a portion of the example graph of FIG. 5A, showing properties and information describing contextual relationships related to one of the nodes representing a shoulder element. The node 540 includes properties such as width, height, area, slope angle, number of point (vertices), radius of gyration, and position. Several edges connect the node 540 to other nodes (not shown in FIG. 5B). Each edge includes information describing contextual relationships such as distance, relative area, specifies if shapes overlap or not and the difference in number of points for each polygon.

At step 250, the set of graphs may be divided to produce a training dataset with a first set of graphs and a validation dataset with a second set of graphs.

At step 260, the GNN model 158 is trained by applying the training dataset to the GNN model 158 with the class labels as targets, and validated using the validation dataset. Loss may be calculated by comparing the label of each element with predicted class and confidence. An overall accuracy may also be determined, which gives an indication of the quality of the learning. Training may continue until loss and/or overall accuracy reaches a predetermined threshold or maximum.

In some implementations, the steps 250-260 may utilize cross-fold validation. To accurately validate performance, training and validation datasets should have similar distributions. However, splitting a dataset into a training dataset and a validation dataset in a manner that achieves this may be challenging. To stabilize performance evaluation during training, and to prevent overfitting, k-fold cross-folds validation may be utilized to shuffle the dataset into k-groups, or folds, of approximately equal size, to repeatedly reserve a fold as the validation dataset, and to train the GNN model 158 on the remaining k−1 folds.

At step 270, the now trained GNN model 158 is saved for use in inference by the design validation service 150.

Figure 6:
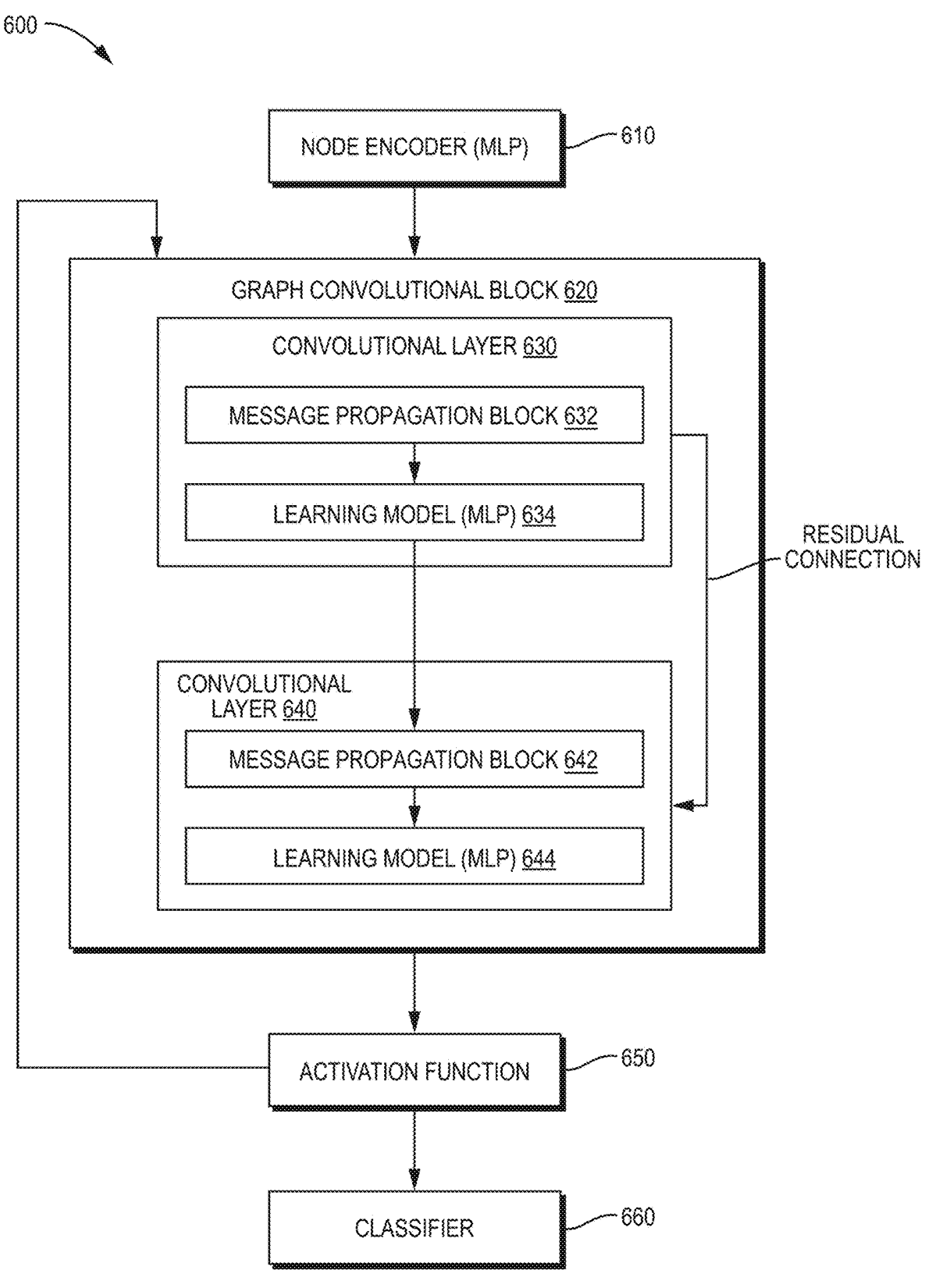
FIG. 6 is a block diagram an architecture of an example GNN that may be trained by operation of the steps of FIG. 2.

FIG. 6 is a block diagram an architecture 600 of an example GNN model 158 that may be trained by operation of the steps 200 of FIG. 2. In the example shown in FIG. 6, the GNN model 158 employs multilayer perceptrons (MLPs) and neighborhood diffusion (message passing). It should be understood, however, that in alternative implementations the GNN may operate differently.

A node encoder 610, for example, structured as a MLP, receives each graph and defines an initial representation for each node therein. The goal of the node encoder 610 is to embed properties of nodes and contextual information of edges into d-dimensional vectors of hidden features via a projection. The d-dimensional vectors are provided to a graph convolutional block 620. The goal of the graph convolutional block 620 is to update the d-dimensional vectors via recursive neighborhood diffusion such that hidden features are updated based on the neighboring nodes and edges connecting to such nodes. The graph convolutional block 620 may be divided into L stacked convolutional layers 630, 640. Stacking L convolutional layers 630, 640 allows the graph convolutional block 620 to build node embeddings from the L-hop neighborhood of each node. Neighboring nodes and edges that are fewer hops away may be given more weight than those further away in the L-hop neighborhood.

Recursive neighborhood diffusion may be performed using message passing, where neighboring nodes and related edges exchange information and influence each other's embeddings. To this end, each convolutional layer 630, 640 may include a message propagation block 632, 642 and a learning model 634, 644. Each message propagation block 632, 642 constructs and passes a message for each neighboring node of that node. Each message propagation block 632, 642 aggregates received messages for each node with an aggregate function, such as a weighted sum. Weights can be determined in various ways, for example, based upon the degree of the node (i.e. number of neighbors of the node), a Softmax function, an attention mechanism that focuses weight on the most relevant neighbors, and/or another mechanism.

A residual connection may be provided between the message propagation blocks 632, 642 to allow information to skip forward to improve convergence. Information may be added to that from the previous layer and passed to the learning models 634, 644. The learning models 634, 644 may be structured as a MLP and output an embedded representation of each node's properties and contextual relationships.

Output of the convolutional layers 630, 640 is provided to an activation function 650. In one implementation, the activation function is a non-linear activation function, such as a rectified linear activation unit (ReLU), sigmoid, or hyperbolic tangent activation function. A classifier 660 receives the activation of each node from the activation function 650 and produces a class prediction including one or more predicted classes for the element represented by the node along with an associated confidence in each class. The classifier 660 may be structured as a fully connected layer.

Figure 7:
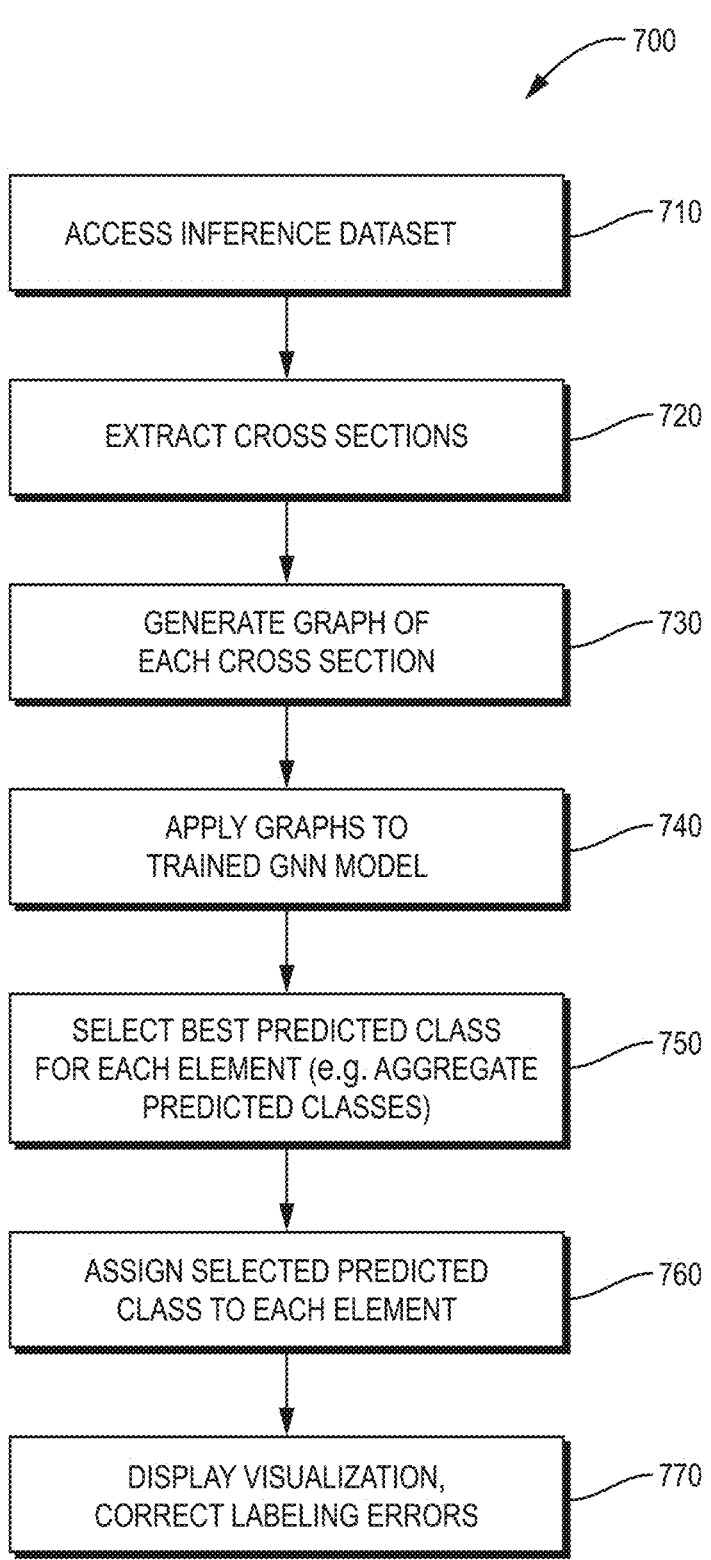
FIG. 7 is a flow diagram of an example sequence of steps that may be executed to use a trained GNN model to predict classes for elements of an infrastructure model that represents linear infrastructure (e.g., a road)

FIG. 7 is a flow diagram of an example sequence of steps 700 that may be executed to use a trained GNN model 158 to predict classes for elements of an infrastructure model that represents linear infrastructure (e.g., a road). The steps may be executed by the design validation service 150 using processes 152-156 thereof.

At step 710, an inference dataset is accessed that includes the infrastructure model that represents linear infrastructure (e.g., roads). At least some (possibly all) of the elements of the inference dataset may initially be missing class information or may have incorrect class information.

At step 720, the cross section extraction process 152 extracts a set of cross sections perpendicular to a centerline of the linear infrastructure from the infrastructure model. The cross section extraction process 152 may first locate alignments in the infrastructure model. The cross section extraction process 152 may then progress at predetermined intervals (e.g., ever 5 meters in model space) and cut cross sections perpendicular to the alignments from a 3D mesh representation starting from one end of each alignment and progressing to the other end. The result may be a set of cross sections.

At step 730, the graph generation process 154 generate a graph representation of each cross section to produce a set of graphs. Again, the nodes of the graph may represent elements and their properties (e.g., geometric properties such as width, height, area, slope angle, number of points (vertices), etc.) and the edges of the graph may represent contextual relationships between elements and information describing the contextual relationships (e.g., geometric information such as distance, angle, number of overlapping points (vertices), etc.).

At step 740, the set of graphs is applied to the trained GNN model 158 to produce class predictions for the elements represented by the nodes in each graph. Each class prediction may include one or more predicted classes and a respective confidence.

At step 750, the selection and aggregation process 156 selects the best predicted class for each element from the class predictions. For elements that extend through only a single cross section (and thereby are included in only one graph), there will be only one relevant class prediction and the selection and aggregation process 156 may simply choose a best predicted class from the one or more predicted classes of the class prediction. In one implementation, the selection and aggregation process 156 may select the best predicted class as the one having the greatest confidence.

For elements that extend through multiple cross sections (and thereby are represented by nodes included in multiple graphs) there will be multiple relevant class predictions originating from the respective graphs. In such case, the selection and aggregation process 156 may aggregate predicted classes from the predictions originating from the different graphs. In one implementation, the aggregation process 156 takes the predicted class having the greatest confidence originating from each graph to create a set of predicted classes and then selects the most commonly occurring predicted class from among this set. However, it should be understood that in other implementations a variety of alternative techniques may be used. For example, in one alternative implementation, the aggregation process 156 considers the top x (e.g., top 1) predicted classes having the greatest confidence originating from each graph to create to have a vote. The class that receives the most votes is then select.

At step 760, the design validation service 150 may assign the selected best predicted class to each element (e.g., filling in missing class information or correcting any misclassification) thereby creating a new version of the infrastructure model. The new version of the infrastructure model may be saved to memory/storage, displayed, or otherwise maintained or exported.

Figure 8:
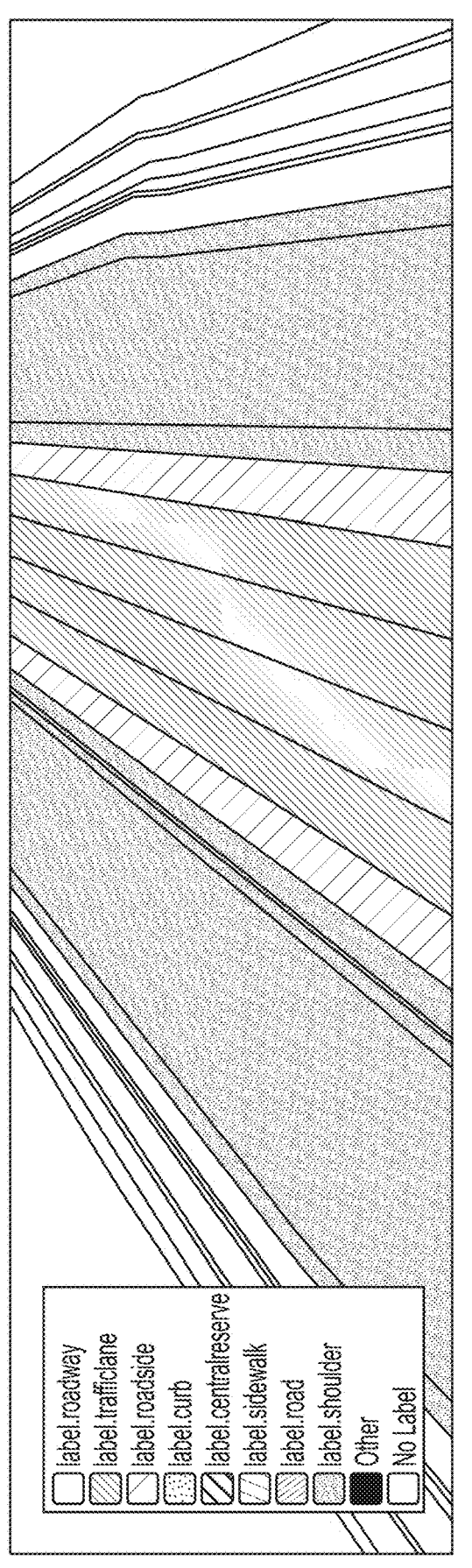
FIG. 8 is a portion of an example labeling user interface showing a visualization of a new version of an infrastructure model.

At optional step 770, the design validation service 150 may display a visualization (e.g., a 3D mesh) of the new version of the infrastructure model in a labeling user interface with indications of the assigned classes. FIG. 8 is a portion 800 of an example labeling user interface showing a visualization of a new version of an infrastructure model. Here, color coding is used to indicate the assigned classes. The user may be prompted to manually review the assigned classes and to correct any errors using functionality of the labeling user interface. Information regarding corrected classes may be maintained and used, for example, to retrain the GNN model to improve future prediction performance.

In summary, improved techniques are provided for classifying elements of an infrastructure model that represents linear infrastructure (e.g., roads). Such techniques may be better suited for use with small training datasets than prior approaches. Further, such techniques may be better able to distinguish between elements that share similar geometry and mainly differ by context.

It should be understood that a wide variety of adaptations and modifications may be made to the techniques to suit various implementations and environments. While it is discussed above that aspects of the techniques can be implemented by specific software executing on specific hardware, it should be understood that the techniques may also be implemented by different software, different hardware or various different combinations thereof. Software may include instructions in a high-level programming language or low-level programming language that may be stored, and compiled or interpreted to run on hardware. For example, instructions may be stored on a non-transitory computing-device readable medium and when executed on one or more processors may be operable to perform the above techniques.

While it is discussed above that certain portions of the techniques may be arranged or distributed in certain ways, it should be understood a wide variety of other arrangements are also possible, and that portions of the techniques may be distributed across software, hardware or combinations thereof in a wide variety of other manners. For example, functionality may be distributed across any of the devices or systems described above, or all functionality may be integrated into a single device or system. Likewise, means for performing any steps described above may include any of the hardware and/or software described above. All such permutations and combinations are intended to fall within the scope of the present disclosure.

It should be understood that the ordering of any method steps discussed above may be changed to suit various situations or requirements. Absent an explicit indication to the contrary, the order of steps described above may be modified such that a subsequent step occurs before a preceding step, or in parallel to such step.

Above all, it should be understood that the above descriptions are meant to be taken only by way of example. Numerous variations, additions, omissions, and other modifications will be apparent to one of ordinary skill in the art, and such variations, additions, omissions, and other modifications should be considered within the scope of this disclosure. Thus, while example embodiments have been shown and described, it will be apparent to those skilled in the art that changes and modifications may be made therein without departing from the spirit and scope of this disclosure.

What is claimed is:

1. A method for classifying elements in an infrastructure model that represents linear infrastructure using a trained graph neural network (GNN) model, comprising:

accessing, by software executing on one or more computing devices, the infrastructure model that represents linear infrastructure;

extracting, by the software, a set of cross sections perpendicular to a centerline of the linear infrastructure from the infrastructure model, wherein the extracting cuts each cross section from a representation of the infrastructure model at an interval;

generating, by the software, a graph representation of each cross section based on information in the infrastructure model to produce a set of graphs having nodes that represent elements in the cross section and edges that represent contextual relationships between the elements;

predicting, by the software using the trained GNN model, classes based on the set of graphs to produce class predictions for the elements represented by the nodes;

selecting a predicted class of each of the elements from the class predictions; and assigning, by the software, predicted classes to respective elements to create a new version of the infrastructure model that is maintained in memory or storage of the one or more computing devices.

2. The method of claim 1, wherein each class prediction includes one or more predicted classes having a respective confidence.

3. The method of claim 2, wherein the selecting further comprises:

for one or more elements that extend through multiple cross sections and thereby are represented by nodes included in multiple graphs, aggregating predicted classes originating from different graphs.

4. The method of claim 3, wherein the aggregating further comprises:

taking a predicted class from the class prediction originating from each graph based on the respective confidence of each predicted class, to create a set of predicted classes for the element; and selecting a predicted class from among the set of predicted classes.

5. The method of claim 2, wherein the selecting further comprises:

for one or more elements that extend through a single cross section and thereby are represented by a node in a single graph, choosing the predicted class based on the respective confidence of each predicted class.

6. The method of claim 1, wherein the nodes further represent properties of the elements in the cross section, and at least one property is a geometric property.

7. The method of claim 6, wherein the geometric property is selected from the group consisting of width, height, area, slope angle, and number of points.

8. The method of claim 1, wherein the contextual relationships represented by the edges include geometric information.

9. The method of claim 8, wherein the geometric information includes at least one item selected from the group consisting of distance, angle, and number of overlapping points.

10. The method of claim 1, further comprising:

displaying, in a user interface of the software, a visualization of the new version of the infrastructure model with indications of the assigned classes; and prompting a user to manually review the assigned classes and to correct any errors in the user interface.

11. The method of claim 1, wherein the linear infrastructure is a road, and the predicted class for one or more of the elements is a roadway class, a traffic lane class, a shoulder class, a roadside class, a curb class, a sidewalk class, or a central reserve class.

12. A computing device, comprising:

a processor; and a memory coupled to the processor and configured to store a software application configured to classify elements in an infrastructure model that represents linear infrastructure, the software application including:

a cross section extraction process configured to extract a set of cross sections perpendicular to a centerline of the linear infrastructure from the infrastructure model by cutting cross sections from a representation of the infrastructure model at an interval, a graph generation process configured to generate a graph representation of each cross section based on information in the infrastructure model to produce a set of graphs having nodes that represent elements in the cross section and edges that represent contextual relationships between the elements, a trained graph neural network (GNN) model configured to predict classes based on the set of graphs to produce class predictions for the elements represented by the nodes, and a selection and aggregation process configured to, for one or more elements that extend through multiple cross sections and thereby are represented by nodes included in multiple graphs, aggregate class predictions originating from different graphs.

13. The computing device of claim 12, wherein the linear infrastructure is a road.

14. A non-transitory electronic-device readable media having instructions stored thereon that when executed on one or more processors of one or more computing devices are operable to:

access an infrastructure model that represents linear infrastructure;

extract a set of cross sections perpendicular to a centerline of the linear infrastructure from the infrastructure model by cutting cross sections from a representation of the infrastructure model at an interval;

generate a graph representation of each cross section based on information in the infrastructure model to produce a set of graphs having nodes that represent elements in the cross section and edges that represent contextual relationships between the elements;

predict, using a trained graph neural network (GNN) model, classes based on the set of graphs to produce class predictions for the elements represented by the nodes, for one or more elements that extend through multiple cross sections and thereby are represented by nodes included in multiple graphs, aggregate class predictions originating from different graphs; and assign a predicted class from the aggregated class predictions to respective elements to create a new version of the infrastructure model.

15. The non-transitory electronic-device readable media of claim 14, wherein the instructions when executed are further operable to:

for the one or more elements that extend through multiple cross sections, take a predicted class from the class prediction originating from each graph based on the respective confidence of each predicted class, to create a set of predicted classes for the element; and select a predicted class from among the set of predicted classes.

16. The non-transitory electronic-device readable media of claim 14, wherein the instructions when executed are further operable to:

for one or more elements that extend through a single cross section and thereby are represented by a node in a single graph, choose a predicted class based on the respective confidence of each predicted class.

17. The non-transitory electronic-device readable media of claim 14, wherein the nodes further represent properties of the elements in the cross section, and at least one property is selected from the group consisting of width, height, area, slope angle, and number of points.

18. The non-transitory electronic-device readable media of claim 14, wherein the contextual relationships represented by the edges include at least one item of geometric information selected from the group consisting of distance, angle, and number of overlapping points.

19. The non-transitory electronic-device readable media of claim 14, wherein the instructions when executed are further operable to:

display a visualization of the new version of the infrastructure model with indications of the assigned classes; and prompt a user to manually review the assigned classes and to correct any errors in the user interface.

20. The non-transitory electronic-device readable media of claim 14, wherein the linear infrastructure is a road and the predicted class for one or more of the elements is a roadway class, a traffic lane class, a shoulder class, a roadside class, a curb class, a sidewalk class, or a central reserve class.

* * * * *